United States Patent
Ko et al.

(10) Patent No.: US 10,360,792 B2
(45) Date of Patent: Jul. 23, 2019

(54) MOBILE DEVICE AND METHOD FOR CONTROLLING MOBILE DEVICE

(71) Applicant: LG ELECTRONICS INC., Seoul (KR)

(72) Inventors: Kyoungsuk Ko, Seoul (KR); Byungjin Kim, Seoul (KR); Jeonghwan Yoon, Seoul (KR); Koh Choi, Seoul (KR); Myunghwan Ha, Seoul (KR); Jaeryong Kim, Seoul (KR); Sunghyuk Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/068,662

(22) PCT Filed: Jan. 27, 2016

(86) PCT No.: PCT/KR2016/000859
§ 371 (c)(1),
(2) Date: Jul. 6, 2018

(87) PCT Pub. No.: WO2017/119536
PCT Pub. Date: Jul. 13, 2017

(65) Prior Publication Data
US 2019/0027021 A1    Jan. 24, 2019

(30) Foreign Application Priority Data
Jan. 8, 2016 (KR) .................. 10-2016-0002661

(51) Int. Cl.
*G08C 17/02* (2006.01)

(52) U.S. Cl.
CPC ......... *G08C 17/02* (2013.01); *G08C 2201/32* (2013.01); *G08C 2201/50* (2013.01); *G08C 2201/91* (2013.01)

(58) Field of Classification Search
CPC ............... G08C 17/02; G08C 2201/50; G08C 2201/32; G08C 2201/91; G08C 2201/92;
(Continued)

(56) References Cited

U.S. PATENT DOCUMENTS

| 9,055,259 B2 | 6/2015 | An et al. |
| 2007/0176899 A1* | 8/2007 | Yoo .................. G06F 3/03542 |
| | | 345/158 |

(Continued)

FOREIGN PATENT DOCUMENTS

| EP | 2752831 | 7/2014 |
| JP | 2007052793 | 3/2007 |

(Continued)

OTHER PUBLICATIONS

PCT International Application No. PCT/KR2016/000859, Written Opinion of the International Searching Authority dated Sep. 28, 2016, 15 pages.

(Continued)

*Primary Examiner* — Thomas D Alunkal
(74) *Attorney, Agent, or Firm* — Lee, Hong, Degerman, Kang & Waimey

(57) ABSTRACT

According to one embodiment of the present invention, a method for controlling a mobile device capable of communicating with a digital device comprises the steps of: transmitting a first pointing signal to a first virtual region; displaying an identification (ID) capable of identifying the digital device positioned in the first virtual region; transmitting a second pointing signal to a second virtual region; and transmitting, to the digital device, a command for executing a specific function of the digital device, with reference to a memory.

20 Claims, 19 Drawing Sheets

(58) Field of Classification Search
CPC ............ G08C 2201/93; G08C 2201/70; G08C 2201/71
See application file for complete search history.

(56) References Cited

U.S. PATENT DOCUMENTS

| | | | | |
|---|---|---|---|---|
| 2012/0098744 A1* | 4/2012 | Stinson, III | ............ | G06F 3/0304 345/158 |
| 2014/0184499 A1* | 7/2014 | Kim | ........ | G08C 17/00 345/156 |
| 2015/0109407 A1* | 4/2015 | Giger | .................... | G01S 17/023 348/36 |
| 2015/0145830 A1* | 5/2015 | Kim | ........ | G08C 17/00 345/175 |
| 2016/0196692 A1* | 7/2016 | Kjallstrom | ............ | G06T 19/006 345/633 |
| 2017/0026195 A1* | 1/2017 | Pan | ........ | H04L 12/282 |

FOREIGN PATENT DOCUMENTS

| | | |
|---|---|---|
| KR | 1020070079210 | 8/2007 |
| KR | 1020090037207 | 4/2009 |
| KR | 1020150034955 | 4/2015 |
| KR | 1020150129592 | 11/2015 |

OTHER PUBLICATIONS

European Patent Office Application Serial No. 16883922.3, Search Report dated May 10, 2019, 7 pages.

\* cited by examiner

FIG. 6
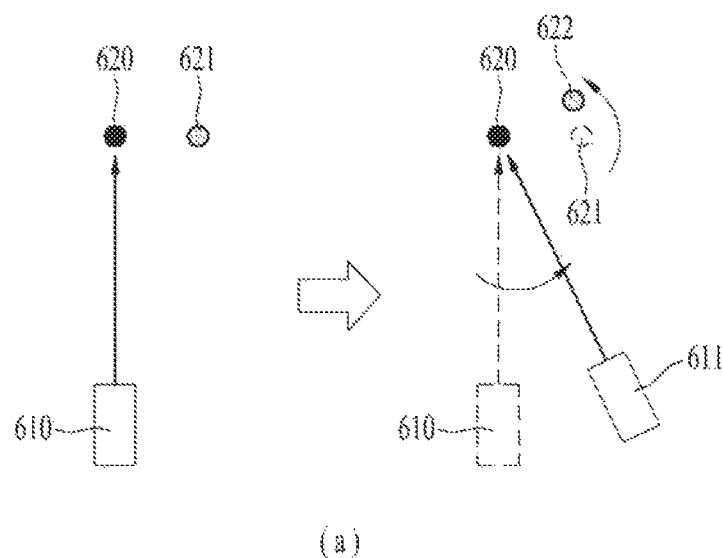
(a)
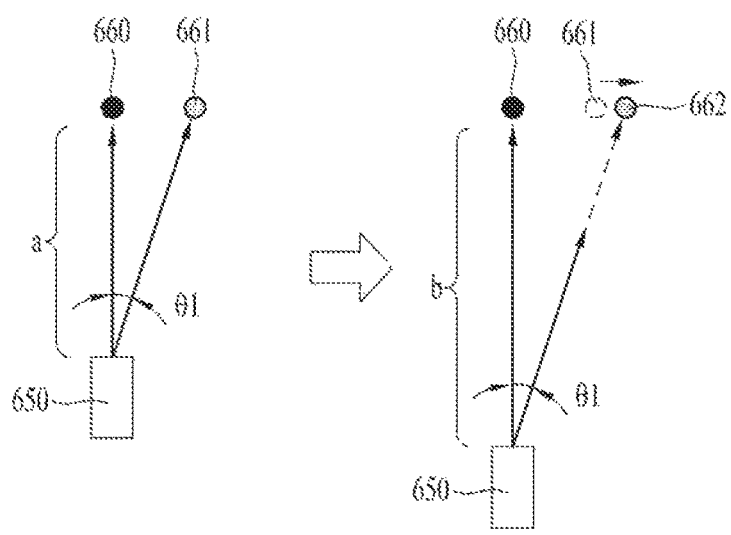
(b)

FIG. 7
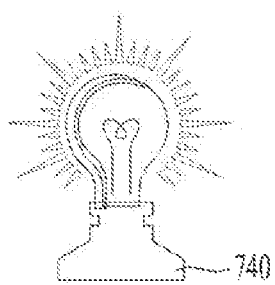
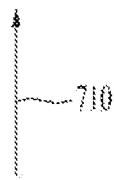
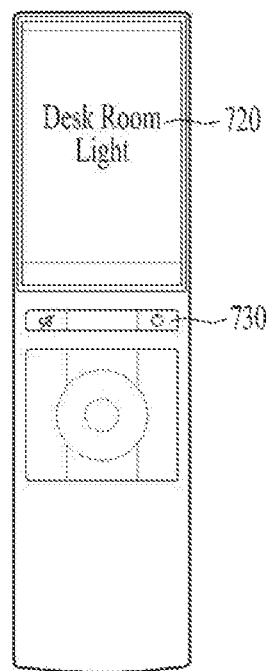

FIG. 9
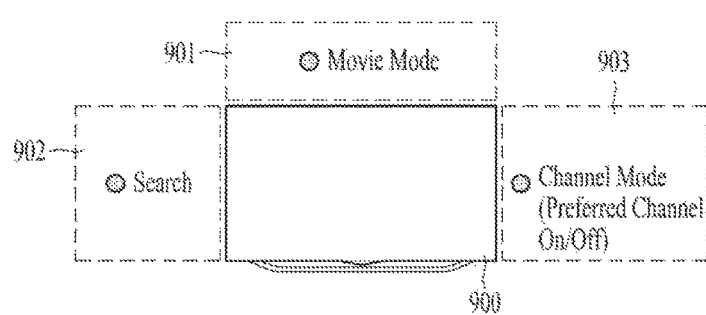
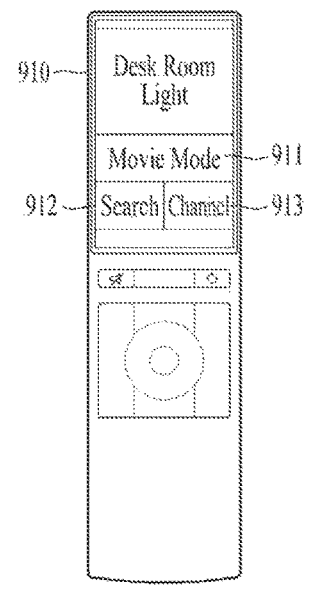
(a)
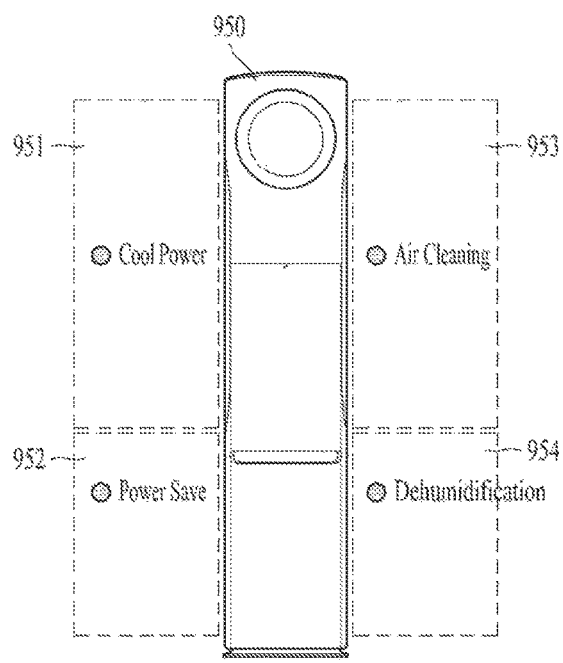
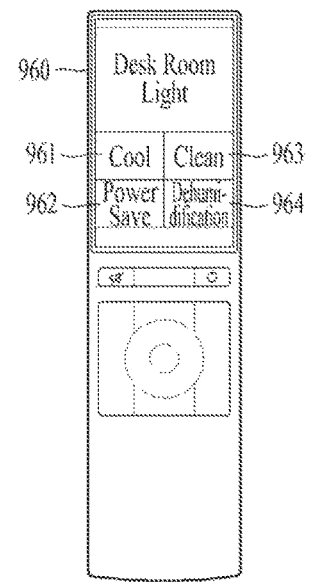
(b)

MOBILE DEVICE AND METHOD FOR CONTROLLING MOBILE DEVICE

CROSS-REFERENCE TO RELATED APPLICATIONS

This application is the National Stage filing under 35 U.S.C. 371 of International Application No. PCT/KR2016/000859, filed on Jan. 27, 2016, which claims the benefit of earlier filing date and right of priority to Korean Application No. 10-2016-0002661, filed on Jan. 8, 2016, the contents of which are all hereby incorporated by reference herein in their entirety.

TECHNICAL FIELD

The present disclosure is techniques related to a mobile device, a digital device, and a method for controlling each of the mobile device and the digital device. Particularly, the present disclosure is applicable for more efficient management of, for example, at least one digital device located indoors.

BACKGROUND ART

Depending on their mobility, terminals may be classified into mobile/portable terminals and stationary terminals. Mobile terminals may further be classified into handheld terminals and vehicle-mounted terminals depending on whether the terminals can be carried directly by users.

Along with the development of a variety of functions, such a terminal is configured as a multimedia player equipped with composite functions such as capturing of a still image or a video, play of music or a video file, and gaming, broadcasting reception.

To execute complex functions of the multimedia player, new various attempts have been made in hardware or software. For example, a user interface environment is provided, in which a user searches for or selects a function easily and conveniently.

In addition, as a mobile terminal is regarded as a personal portable item representing the personality of its user, various designs have been demanded for mobile terminals. The design of a mobile terminal includes structural changes and modifications which enable the user to more conveniently use the mobile terminal. One of the structural changes and modifications may be considered for a manipulation unit.

However, although a global positioning system (GPS)-based device positioning technique is efficient outside a building, it is not viable in more correctly positioning a device within the building.

DISCLOSURE

Technical Problem

An aspect of the present disclosure, which is devised to satisfy the afore-mentioned need, is to provide a mobile device capable of measuring the position of a digital device or a specific region indoors, and controlling a system including the digital device and the specific region. Particularly, the present disclosure is intended to provide a novel technique which obviates the need for actually measuring the physical position of a reference device (or anchor device) in a triangulation-based indoor positioning system (IPS).

Another aspect of the present disclosure is to provide a mobile device capable of displaying a different graphic image related to a digital device to be controlled, according to the position and direction of the mobile device.

Another aspect of the present disclosure is to provide a solution of minimizing a time taken to execute a specific function of a digital device to be controlled.

Technical Solution

In an aspect of the present disclosure, a method for controlling a digital device capable of communicating with a mobile device includes receiving a first pointing signal from the mobile device, if the received first pointing signal is sensed in a first virtual region, accessing a memory, receiving a second pointing signal from the mobile device, and if the received second pointing signal is sensed in a second virtual region, executing a specific function of the digital device, referring to the memory.

In another aspect of the present disclosure, a method for controlling a mobile device capable of communicating with a digital device includes transmitting a first pointing signal to a first virtual region, displaying an identification (ID) identifying the digital device located in the first virtual region, transmitting a second pointing signal to a second virtual region, and transmitting, to the digital device, a command for execution of a specific function of the digital device, referring to a memory.

In another aspect of the present disclosure, a digital device capable of communicating with a mobile device includes a communication module configured to conduct data communication with the mobile device, a memory configured to store at least one data, and a controller coupled to the communication module and the memory. The controller is configured to receive a first pointing signal from the mobile device by controlling the communication module, to access the memory, if the received first pointing signal is sensed in a first virtual region, to receive a second pointing signal from the mobile device by controlling the communication module, and to execute a specific function of the digital device, referring to the memory, if the received second pointing signal is sensed in a second virtual region.

In another aspect of the present disclosure, a mobile device capable of communicating with a digital device includes a display module, a communication module configured to conduct data communication with the digital device, a memory configured to store at least one data, and a controller coupled to the display module, the communication module, and the memory. The controller is configured to transmit a first pointing signal to a first virtual region by controlling the communication module, to display an identification (ID) identifying the digital device located in the first virtual region by controlling the display module, to transmit a second pointing signal to a second virtual region by controlling the communication module, and to transmit, to the digital device, a command for execution of a specific function of the digital device, referring to the memory.

Advantageous Effects

According to at least one of the embodiments of the present disclosure, it is possible to accurately measure the position of a digital device or a specific region indoors (within a building). Particularly, the present disclosure has the technical effect of obviating the need for actually measuring the physical position of a reference device (or anchor device) in a triangulation-based IPS.

Further, according to at least one of the embodiments of the present disclosure, it is possible to display a different graphic image related to a digital device to be controlled, according to the position and direction of a mobile device.

According to at least one of the embodiments of the present disclosure, the technical effect of minimizing a time taken to execute a specific function of a digital device to be controlled is achieved.

It will be appreciated by persons skilled in the art that the effects that can be achieved with the present disclosure are not limited to what has been particularly described hereinabove and other advantages of the present disclosure will be more clearly understood from the following detailed description.

BRIEF DESCRIPTION OF THE DRAWINGS

FIG. 6 is a view illustrating a process of changing a virtual region for execution of a quick mode according to a change in the position of a mobile device according to an embodiment of the present disclosure.

FIG. 7 is a view illustrating a response result of a digital device, when a mobile device points at a first virtual region according to an embodiment of the present disclosure.

FIG. 9 is a view illustrating another exemplary response result of a digital device, when a mobile device points at a second virtual region according to an embodiment of the present disclosure.

BEST MODE FOR CARRYING OUT THE INVENTION

Figure 1:
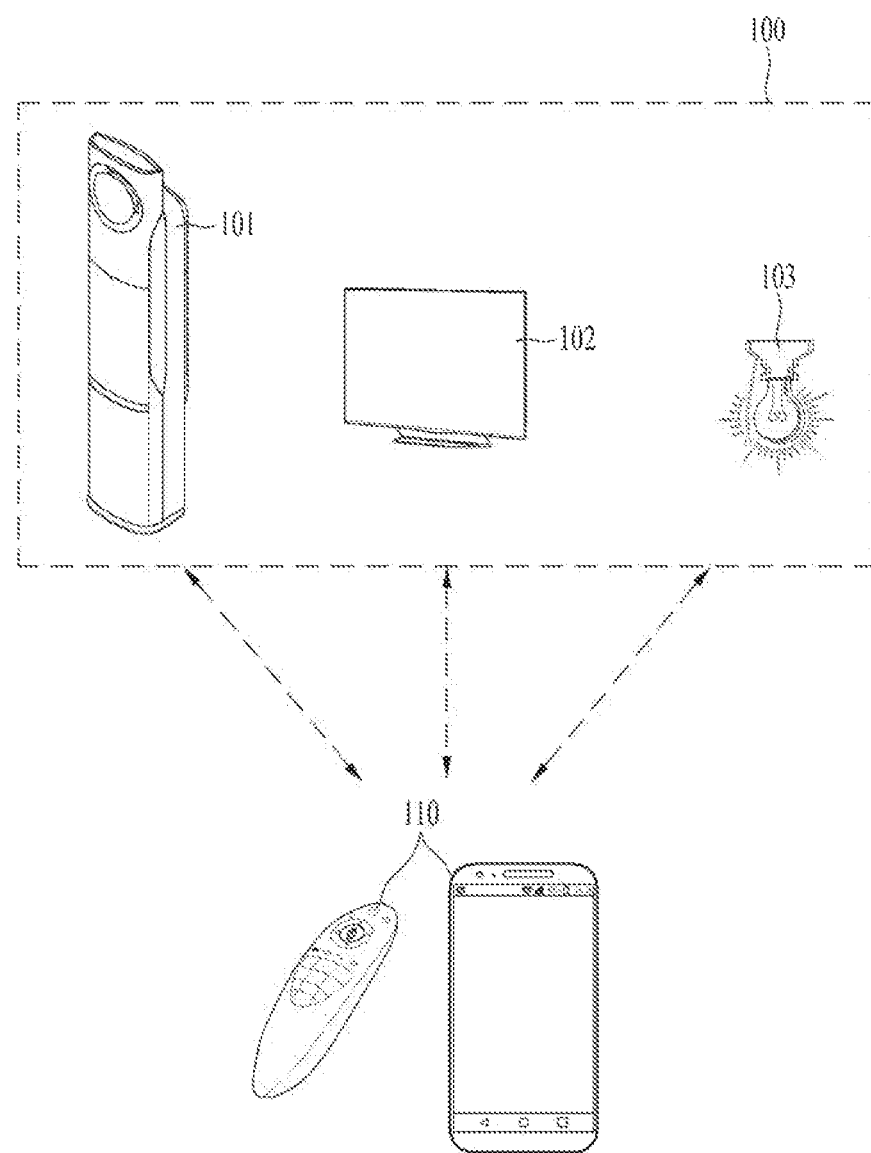
FIG. 1 is a view illustrating an overall system according to an embodiment of the present disclosure.

Hereinbelow, embodiments of the present disclosure will be described in detail with reference to the accompanying drawings. Irrespective of figure numbers, the same or similar components are denoted by like reference numerals, and a redundant description of the components is avoided. In the following description, postfixes attached to the names of components, "module" and "unit" are assigned or interchangeably used only in consideration of ease of the description, and do not have differentiated meanings or functions. Further, lest it should obscure the subject matter of the embodiments of the present disclosure, a related known technology is not described. In addition, the accompanying drawings are given only to help with the understanding of the embodiments of the present disclosure, not limiting the technical spirit of the present disclosure, and it is to be understood that the disclosure covers various modifications, equivalents, and alternatives falling within the scope and spirit of the embodiments of the disclosure.

Terms including an ordinal number such as first or second may be used to describe various components, not limiting the components. The terms are used only for the purpose of distinguishing one component from another component.

When it is said that a component is "coupled with/to" or "connected to" another component, it should be understood that the one component is connected to the other component directly or through any other component. On the other hand, when it is said that a component is "directly coupled to" or "directly connected to" another component, it may be understood that there is no other component between the components.

Unless the context clearly dictates otherwise, singular forms include plural referents.

In the present disclosure, it is to be understood that the term "include" or "have" signifies the presence of a feature, a number, a step, an operation, a component, or a part, or a combination thereof as described in the disclosure, not excluding the presence or the possibility of addition of one or more other features, numbers, steps, components, or parts, or combinations thereof.

FIG. 1 is a view illustrating an overall system according to an embodiment of the present disclosure.

As illustrated in FIG. 1, an overall system according to an embodiment of the present disclosure includes IoT devices 100 and a mobile device 110. The mobile device 110 may be, for example, a remote control or a portable phone. Further, the IoT devices 110 may be, for example, an air conditioner 101, a TV 102, and a light bulb 103.

Particularly, even when the IoT devices 100 do not have display modules, the present disclosure is applicable. One feature of the present disclosure lies in that a quick mode is provided to fast access a specific function of the IoT devices 100 as well as all IoT devices 100 may be controlled by the single mobile device 110.

Meanwhile, it is assumed in the present disclosure that the mobile device 100 has knowledge of the position of each IoT device 100 as well as the position of the mobile device 100 in a home. Therefore, a conventional IPS technique may be adopted, or an IPS technique of the present disclosure which will be described later with reference to FIG. 10 may be adopted. It is obvious that the scope of the present disclosure should be interpreted according to the content of the claims.

Although there is a conventional universal remote control, a process of selecting a device to be controlled is complex and many buttons are unnecessary. Moreover, no tool is provided, which enables fast access to a specific function.

Furthermore, more and more digital devices are to be controlled in the era of IoT which has recently attracted much intention. Meanwhile, certain functions are mainly used in the digital devices.

If a digital device to be controlled does not have a display, it is difficult to implement a quick mode which enables fast access to a specific function.

The present disclosure is intended to solve all these problems and define a solution of allowing a mobile device to control a plurality of digital devices with minimum cost.

Figure 2:
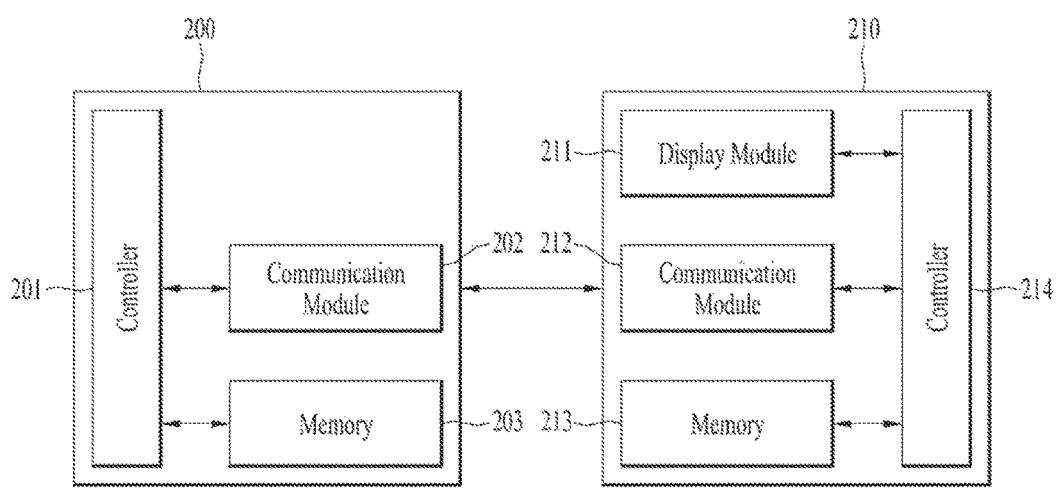
FIG. 2 is a block diagram illustrating components of each of a mobile device and a digital device according to an embodiment of the present disclosure.

FIG. 2 is a block diagram of components of each of a mobile device and a digital device according to an embodiment of the present disclosure.

A digital device 200 according to an embodiment of the present disclosure includes a communication module 202 which conducts data communication with a mobile device, a memory 203 which stores at least one data, and a controller 201 coupled to the communication module 202 and the memory 203.

Particularly, the controller 201 receives a first pointing signal from a mobile device 210 by controlling the communication module 202. If the received first pointing signal is sensed in a first virtual region, the controller 201 accesses the memory 203, and receives a second pointing signal from the mobile device 210 by controlling the communication module 202.

If the received second pointing signal is sensed in a second virtual region, the controller 201 executes a specific function of the digital device 200, referring to the memory 203. This process may be referred to as a quick mode in the present disclosure.

The first virtual region includes a range in which a point pointed at by the mobile device 210 is formed inside the digital device 200, and the second virtual region includes a range in which a point pointed at by the mobile device 210 is formed outside the digital device 200. The above-described first and second virtual regions will be described later in greater detail with reference to FIGS. 5 to 9.

The memory 203 is characterized in that the second virtual region is stored mapped to the specific function. Further, a plurality of second virtual regions are defined, and separated with respect to the position of the digital device 200.

Meanwhile, according to another embodiment of the present disclosure, the second virtual region is characteristically changed according to the distance between the mobile device 210 and the digital device 200 or the angle between the mobile device 210 and the digital device 200.

According to an embodiment of the present disclosure, the mobile device 210 includes a display module 211, a communication module 212 which conducts data communication with the digital device 200, a memory 213 which stores at least one data, and a controller 214 coupled to the display module 211, the communication module 212, and the memory 213.

The controller 214 transmits a first pointing signal to a first virtual region by controlling the communication module 212, and displays an identification (ID) which identifies the digital device 200 located in the first virtual region.

Further, the controller 214 transmits a second pointing signal to a second virtual region by controlling the communication module 212, and transmits, to the digital device 200, a command for executing a specific function of the digital device 200, referring to the memory 213.

Figure 3:
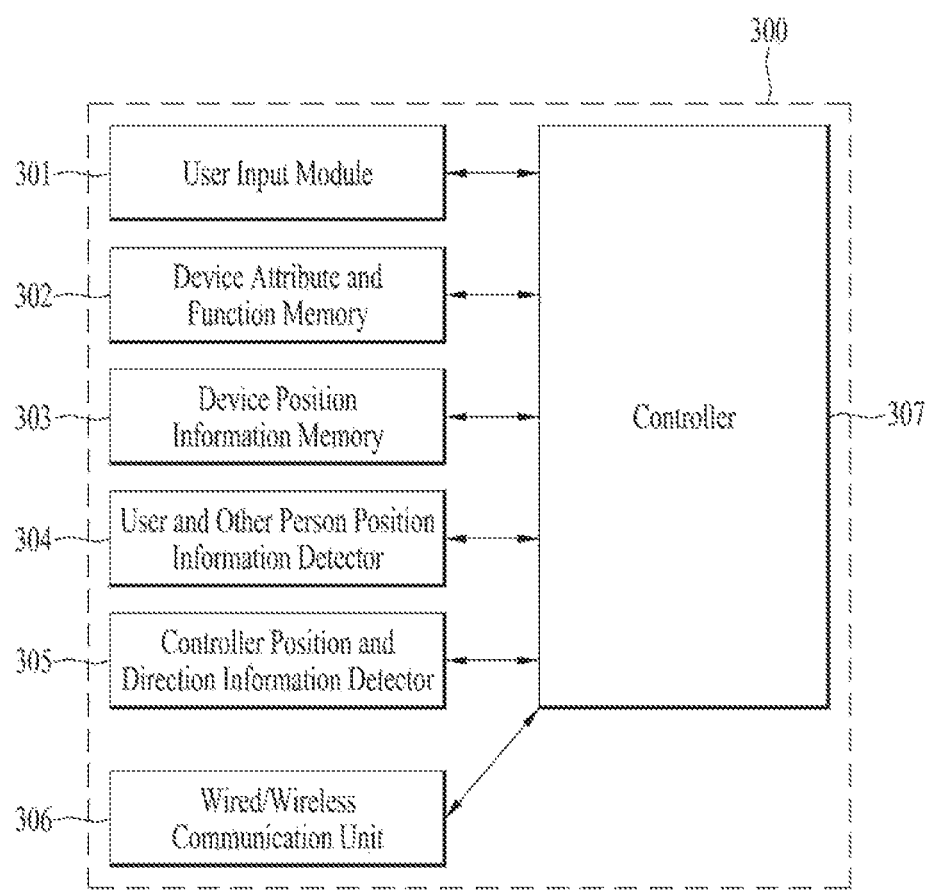
FIG. 3 is a detailed view illustrating an example of the mobile device illustrated in FIG. 2.

FIG. 3 is a detailed view illustrating an example of the mobile device illustrated in FIG. 2. As described before, a mobile device 300 illustrated in FIG. 3 corresponds to, for example, a portable phone or a remote control. That is, a person skilled in the art could implement a mobile device by a portable phone or a remote control, on the basis of the description of the mobile device in the present disclosure.

A user input module 301 corresponds to, for example, a touch module or a general button. A device attribute and function memory 302 stores basic information and function information about a digital device to be controlled, within a building (e.g., a home).

A device position information memory 303 stores position information about the digital device to be controlled within the building. As described later with reference to FIG. 10, the mobile device 300 may detect its position by communicating with a reference device installed indoors. In addition, a process of pointing at a digital device by a mobile device may be required in order to determine the position of the digital device located within the building. For example, if the mobile device determines a distance based on a signal strength or the like by communicating with the digital device, and determines a direction through a 6-axis or 9-axis sensor of the mobile device, the mobile device may calculate position information about the digital device located indoors.

A user and other person position information detector 304 estimates the position of a user based on the position of the mobile device 300, and determines the position of another person carrying another mobile device based on position information of this another mobile device.

A controller position and direction information detector 305 calculates the position of the mobile device 300 by communicating with reference devices as described later with reference to FIG. 10, and further calculates direction information about the mobile device 300 through the 6-axis or 9-axis sensor.

A wired/wireless communication unit 306 communicates with reference devices or in-home digital devices. The controller 307 may be configured as a CPU or the like, is coupled to all of the forgoing modules, and controls each module.

Figure 4:
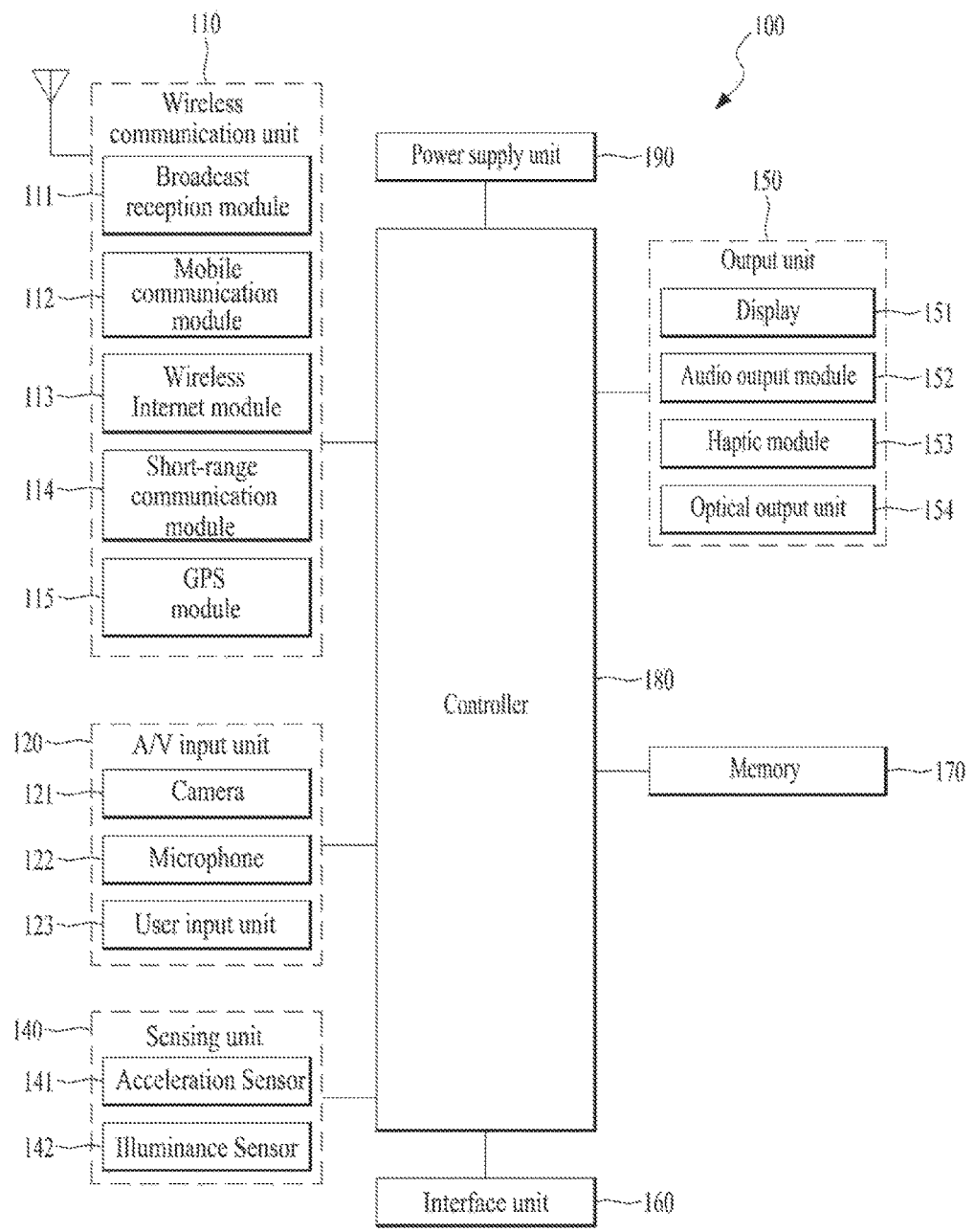
FIG. 4 is a detailed view illustrating another example of the mobile device illustrated in FIG. 2.

FIG. 4 is a detailed view illustrating another example of the mobile device illustrated in FIG. 2.

As described in FIG. 4, the mobile terminal 100 (or mobile device) is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

For example, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (110) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 4, or activating application programs stored in the memory 170. As one example, the controller 180 controls some or all of the components illustrated in FIG. 4 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one of element among the elements discussed above performs with cooperating with other elements in order to obtain embodiments below. Furthermore, the operations within the mobile device perform based on at least one of program stored in the memory (170).

Referring still to FIG. 4, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (110) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Figure 5:
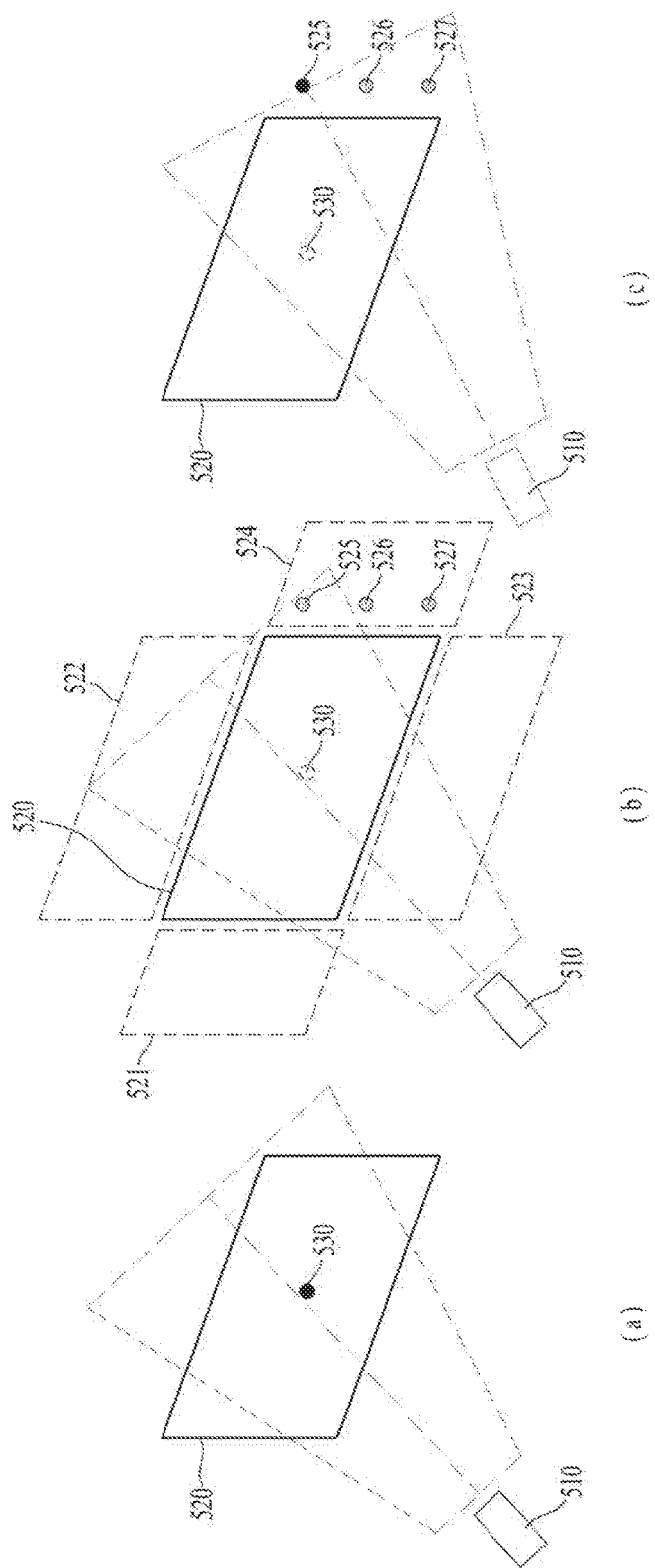
FIG. 5 is a view illustrating a process of generating a virtual region for execution of a quick mode according to an embodiment of the present disclosure.

FIG. 5 is a view illustrating a process of generating a virtual region for executing a quick mode according to an embodiment of the present disclosure. Now, a description will be given below of a solution of mapping and applying a quick function of a digital device pointed at by a mobile device (e.g., a portable phone or a remote control) onto a virtual space.

As illustrated in (a) of FIG. 5, it is assumed that a mobile device 510 according to an embodiment of the present disclosure points at a digital device 520 to be controlled. That is, a point 530 pointed at by the mobile device 510 is located in a first virtual region corresponding to the digital device 520. If a pointing signal from the mobile device is sensed in the first virtual region (this is a procedure for determining a digital device to be controlled), the digital device 520 generates one or more second virtual regions 521, 522, 523, and 524 around the digital device 520, each second virtual region being mapped to a specific function of the digital device 520, as illustrated in (b) of FIG. 5. For example, as illustrated in (b) of FIG. 5, a very top end of the second virtual region 524 to the right of the digital device 520 is mapped to a first specific function, a middle point 526 of the second virtual region 524 is mapped to a second specific function, and a very bottom end 527 of the second virtual region 524 is mapped to a third specific function. Apparently, a design which enables a user to freely edit the specific functions or the second virtual regions falls within another scope of the present disclosure.

Therefore, as illustrated in (c) of FIG. 5, once the mobile device 510 points at the specific point 525 in the second virtual region, the specific function of the digital device 520, mapped to the specific point 525 is automatically executed.

FIG. 6 is a view illustrating a process of changing a virtual region for execution of a quick mode according to a change in the position of a mobile device according to an embodiment of the present disclosure.

As illustrated in the left drawing of (a) of FIG. 6, a first virtual region 620 and a second virtual region 621 are determined with respect to a mobile device 610. As described before, in concept, the first virtual region 620 includes an area in which a specific digital device is located, whereas the second virtual region 621 includes an area around the specific digital device.

Meanwhile, as illustrated in the right drawing of (a) of FIG. 6, if the mobile device moves from the old position 610 to a new position 611, the first virtual region 620 including the area in which the digital device is located is still the same, whereas the second virtual region should be moved from the old point 621 to a new point 622.

Further, as illustrated in the left drawing of (b) of FIG. 6, a first virtual region 660 and a virtual second region 661 are determined according to a distance a between a mobile device 650 and a digital device. The angle between the center point of the first virtual region 660 and the center point of the second virtual region 661 is determined according to the distance a, as illustrated in (b) of FIG. 6.

Meanwhile, as illustrated in the right drawing of (b) of FIG. 6, a design is made such that if the mobile device 650 gets farther from the digital device (i.e., the distance between the two devices is changed to b), the second virtual region is also changed from the old point 661 to a new point 622. That is, this is meant not to change the angle, and only this design brings about the technical effect that the quick mode can be executed by moving the mobile device only at the same angle and pointing at the digital device by the mobile terminal irrespective of the distance between the digital device and the mobile device.

FIG. 7 is a view illustrating a response result of a digital device, when a mobile device points at a first virtual region according to an embodiment of the present disclosure.

If the mobile device points at a first region 740 as indicated by reference numeral 710, the mobile device displays, on a screen 720, the name of the digital device to be controlled.

Upon selection of a power button 730 of the mobile device, a command to power on a light bulb in the first virtual region 740 is transmitted.

However, to implement the above operation, the mobile device should have prior knowledge of the existence of the specific digital device (e.g., the light bulb) in the pointing direction 710 of the mobile device. For example, a process configurable through data communication between the two devices or a process of registering the position of the specific digital device by the mobile device is applicable.

More specifically, for example, if the mobile device performs a registration process while pointing at the specific digital device, a direction toward the specific digital device may be calculated by a 6-axis or 9-axis sensor of the mobile device. However, the mobile device needs to know its in-home position at the moment of pointing at the specific digital device, for accurate positioning. A solution of determining the position of the mobile device indoors will be described later in greater detail with reference to FIG. 10.

Figure 8:
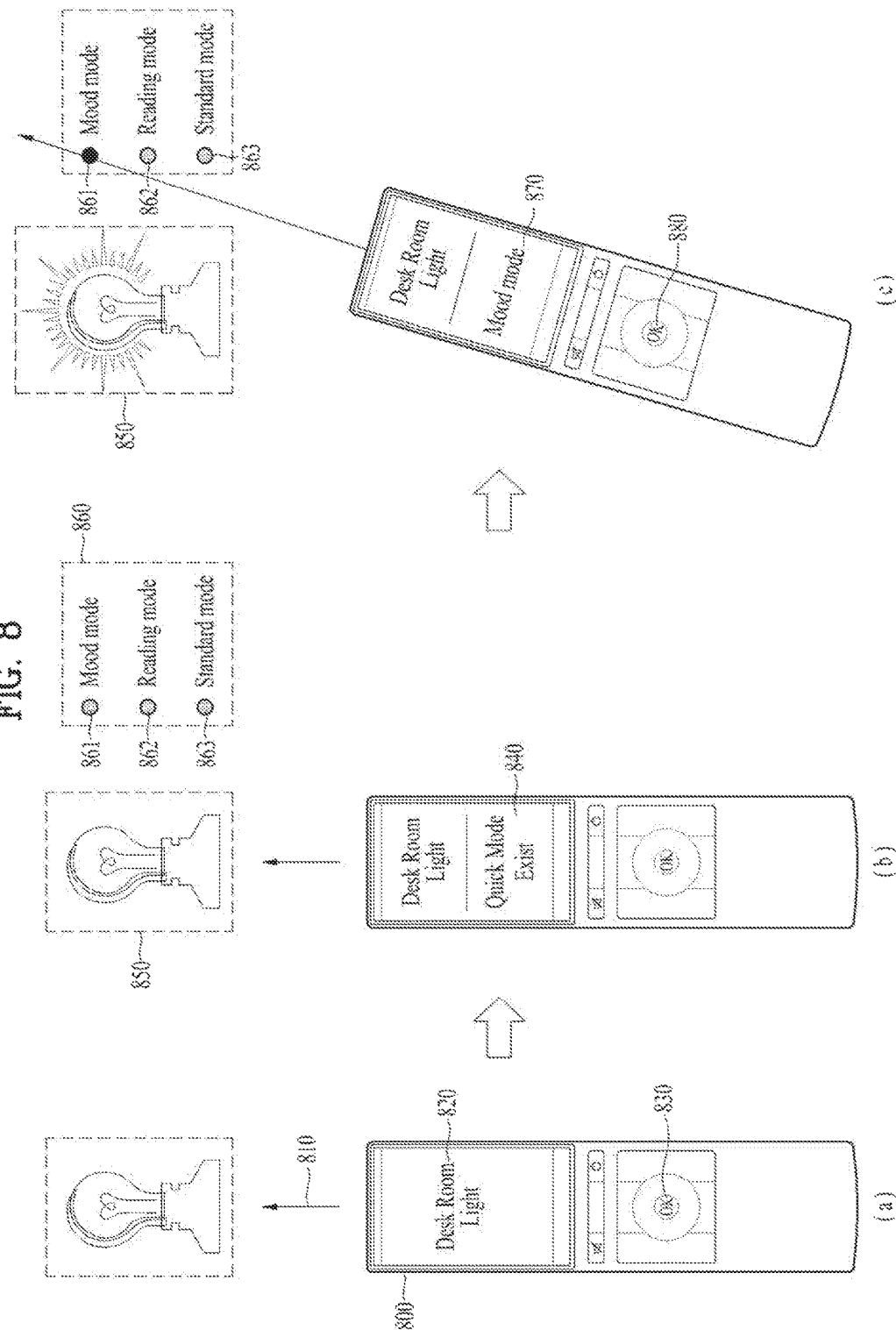
FIG. 8 is a view illustrating an exemplary response result of a digital device, when a mobile device points at a second virtual region according to an embodiment of the present disclosure.

FIG. 8 is a view illustrating an exemplary response result of a digital device, when a mobile device points at a second virtual region according to an embodiment of the present disclosure.

As illustrated in (a) of FIG. 8, if a mobile device 800 points at a first virtual region in which a specific digital device is located, as indicated by reference numeral 810, the mobile device 800 displays the name of the specific digital device located in the first virtual region on a screen 820. Further, upon selection of a confirm button or an OK button 830, a quick mode is set. The quick mode refers to immediate execution of a specific function of the digital device without any interruption, as the mobile device points at the vicinity of the digital device.

As illustrated in (b) of FIG. 8, when the mobile device points at a first virtual region 850 in which the specific digital device is located, a second virtual region 860 enabling execution of the quick mode is generated in the vicinity of the first virtual region 850. For example, if a very top end point 861 is pointed at in the second virtual region 860, the color or brightness of a light bulb illustrated in FIG. 8 is changed to that of a mood mode. If a middle point 862 in the second virtual region 860 is pointed at, the color or brightness of the light bulb illustrated in FIG. 8 is changed to that of a reading mode. If a very bottom end point 863 is pointed at in the second virtual region 860, the color or brightness of the light bulb illustrated in FIG. 8 is changed to that of a standard mode.

Further, the mobile device provides an option 840 to turn off the quick mode. A design is made such that if the option 840 is selected, all objects in the second virtual region 860 disappear, thereby preventing data loss.

As illustrated in (c) of FIG. 8, if the mobile device points at the specific point 861 in the second virtual region defined in the vicinity of the specific digital device, not the first virtual region 850 in which the specific digital device is located, the mobile device outputs a message 870 which guides to a corresponding mode. Owing to a feedback function of the guide message 870, the technical effect of preventing execution of a quick mode different from a user's intended quick mode is achieved.

Further, if an OK button 880 is selected while the specific point 861 is pointed at, the light bulb located in the virtual first region 850 executes a specific function corresponding to the mood mode.

Accordingly, for implementation of the quick mode, the data structure of Table 1 below should be pre-stored in at least one of the mobile device or the digital device

TABLE 1

| Second virtual region | Mapped specific function (quick mode) |
|---|---|
| Right of TV | Execution of channel mode of TV |
| Above TV | Execution of movie mode of TV |
| Left of TV | Execution of search mode of TV |

With reference to FIG. 9, a specific embodiment to which Table 1 is applied will be described in greater detail.

FIG. 9 is a view illustrating another exemplary response result of a digital device, when a mobile device points at a second virtual region according to an embodiment of the present disclosure.

As described before with reference to FIG. 8 and Table 1, the data structure of mapping regions (second virtual regions) around the digital device to specific functions of the digital device is stored in the memory of the digital device or the mobile device.

Referring to (a) of FIG. 9 based on the above premise, if a mobile device 910 points at a digital device 900 (i.e., a region in which the digital device is located, that is, a first virtual region), the mobile device 910 displays guide messages 911, 912 and 913 indicating modes mapped to second virtual regions defined around the digital device.

Therefore, if the mobile device 910 points at one (e.g., a right region) 903 of the second virtual regions of the digital device 900 and an OK button is pressed, the digital device immediately executes the channel mode. That is, the quick mode for the channel mode is executed.

Meanwhile, if the mobile device 910 points at another (e.g., an upper region) 901 of the second virtual regions of the digital device 900 and the OK button is pressed, the digital device immediately executes the movie mode. That is, the quick mode for the movie mode is executed.

If the mobile device 910 points at a third (e.g., a left region) 902 of the second virtual regions of the digital device 900 and the OK button is pressed, the digital device immediately executes the search mode. That is, the quick mode for the search mode is executed.

While the digital device illustrated in (a) of FIG. 9 has been described as a TV, by way of example, (b) of FIG. 9 illustrates an air conditioner as an example of the digital device.

Figure 10:
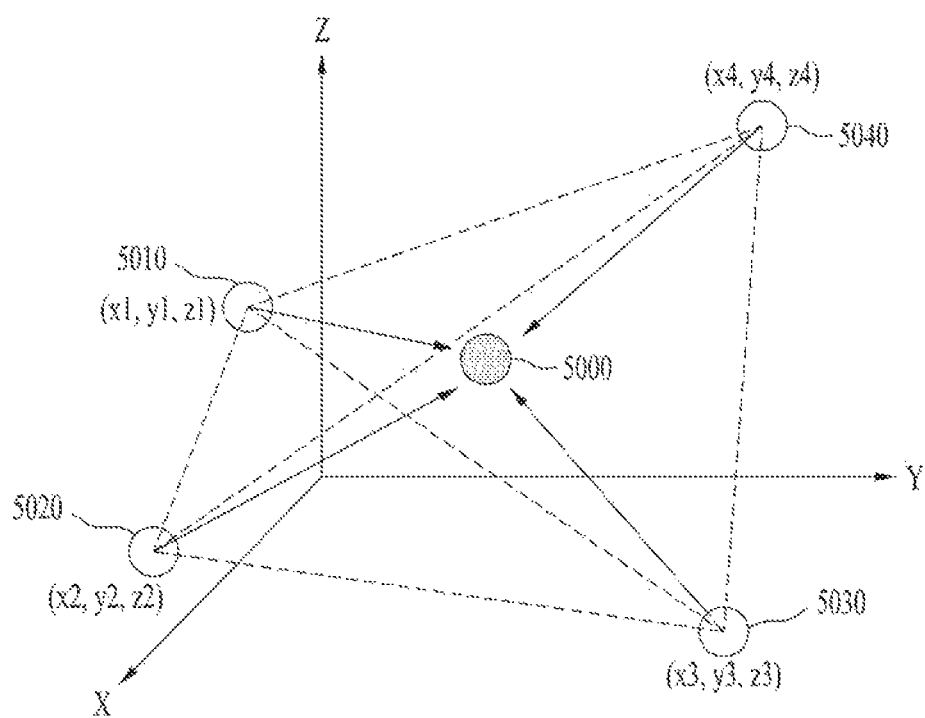
FIG. 10 is a view illustrating an overall triangulation-based indoor positioning system (IPS).

As illustrated in (a) of FIG. 10, if a mobile device 960 points at a digital device 950 (i.e., a region in which the digital device is located, that is, a first virtual region), the mobile device 960 displays guide messages 961, 962, 963 and 964 indicating modes mapped to second virtual regions defined around the digital device. The positions of the guide messages being identical to the positions of the plurality of second virtual regions fall within another scope of the present disclosure.

Therefore, if the mobile device 960 points at one (e.g., a right upper region) 953 of the second virtual regions of the digital device 950 and an OK button is pressed, the digital device immediately executes an air cleaning mode.

Thus, if the mobile device 960 points at another (e.g., a right bottom region) 954 of the second virtual regions of the digital device 950 and the OK button is pressed, the digital device immediately executes a dehumidification mode.

Thus, if the mobile device 960 points at a third one (e.g., a left upper region) 951 of the second virtual regions of the digital device 950 and the OK button is pressed, the digital device immediately executes a cool power mode.

Thus, if the mobile device 960 points at a fourth one (e.g., a left bottom region) 952 of the second virtual regions of the digital device 950 and the OK button is pressed, the digital device immediately executes a power save mode.

Meanwhile, the present disclosure is applicable to outdoors. In this case, a GPS signal is used. However, the biggest shortcoming of the GPS lies in that the GPS does not operate indoors in which GPS signals cannot be received. For example, a smartphone with a built-in GPS function may search for the main entrance of a large shopping mall, but fail in searching for a specific store or a restroom in the shopping mall. To solve the problem, an IPS has been introduced.

Most of IPS techniques using ultra wideband (UWB), Wi-Fi, Bluetooth, etc. adopt triangulation for positioning. Triangulation is performed by using an anchor device (or reference device) serving as a position origin, and a mobile device to be positioned.

In general, three or more reference devices as position origins are required for two-dimensional (2D) positioning, and four or more reference devices as position origins are required for 3D positioning.

However, if an angle of arrival (AOA) algorithm is applied, two or more reference devices are required. Even in this case, the present disclosure as described with reference to FIG. 10 is also applicable. Further, in the case of a single reference device, it is also possible to set an origin reference device by pointing the mobile device to the reference device.

Meanwhile, only if reference devices have knowledge of their position coordinates with respect to an origin, the reference devices may determine unique position relationships between the mobile terminal and the reference devices. Therefore, according to the conventional technology, the position of each reference device should be physically measured in order to acquire position information about the reference device. A related problem will be described later in greater detail with reference to FIGS. 10 and 11.

Meanwhile, according to the present disclosure which will be described below, it is possible to fast set the coordinates of the positions of reference devices by using the 6-axis or 9-axis sensor of the mobile terminal. This operation will be described later in greater detail with reference to FIGS. 12 to 19.

FIG. 10 is a view illustrating an overall triangulation-based indoor positioning system (IPS). It is assumed in FIG. 10 that four reference devices (referred to as anchors or anchor devices) are required for 3D positioning. Apparently, three reference devices are sufficient for 2D positioning.

As illustrated in FIG. 10, the coordinates of the positions of reference devices 5010, 5020, 5030, and 5040 used in the IPS should be determined in order to position a mobile terminal 5000 located in a home. The conventional technology has the problem that a user or an expert should measure the positions of the reference devices preliminarily, and then input the coordinates of the positions.

For example, after the user or the expert directly measures the positions of the reference devices, the user or the expert should store, in a memory, the coordinates (x1, y1, z1) of the position of the first reference device 5010, the coordinates (x2, y2, z2) of the position of the second reference device 5020, the coordinates (x3, y3, z3) of the position of the third reference device 5030, and the coordinates (x4, y4, z4) of the position of the fourth reference device 5040. Therefore, accuracy is poor and an unnecessary time is taken. Although each reference device may measure a distance by communicating with other reference devices, this case also has a problem. In this context, FIG. 11 will be described below in detail.

Figure 11:
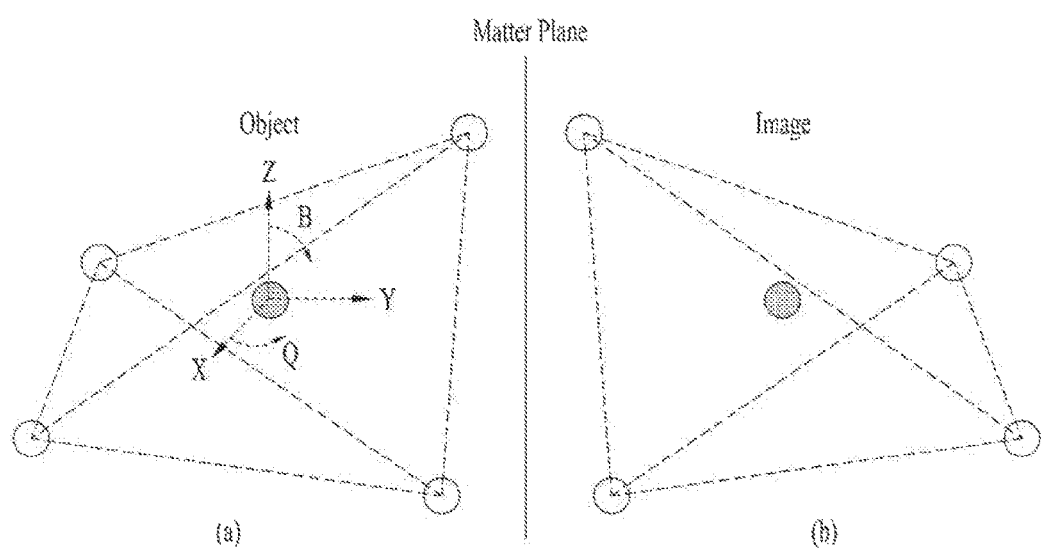
FIG. 11 is a view referred to for describing a problem encountered with the conventional triangulation-based IPS illustrated in FIG. 10.

FIG. 11 is a view referred to for describing a problem encountered with the conventional triangulation-based IPS illustrated in FIG. 10. As described before, it is assumed that distances between reference devices are calculated through communication between the reference devices.

However, without information about the coordinates of the positions of the reference devices, the mobile terminal may not get knowledge of accurate directions in which the respective reference devices are located. Particularly, since the positions of the reference devices and the mobile terminal are relative positions, it may not be determined only based on distance information whether an image formed by the reference devices is the image illustrated in (a) of FIG. 11 or the image illustrated in (b) of FIG. 11, which is formed by a mirror plane.

Moreover, without the information about the coordinates of the positions of the reference devices, the mobile terminal may not determine a first angle with respect to a z axis and a second angle with respect to an x axis. In addition, the mobile terminal may not determine rotation information based on the first angle and the second angle.

Due to the above-described problems, there is a pressing need for a solution of enabling even a layman to easily and fast set position information about reference devices in an IPS environment. The solution will be described below with reference to FIGS. 12 to 19.

Figure 12:
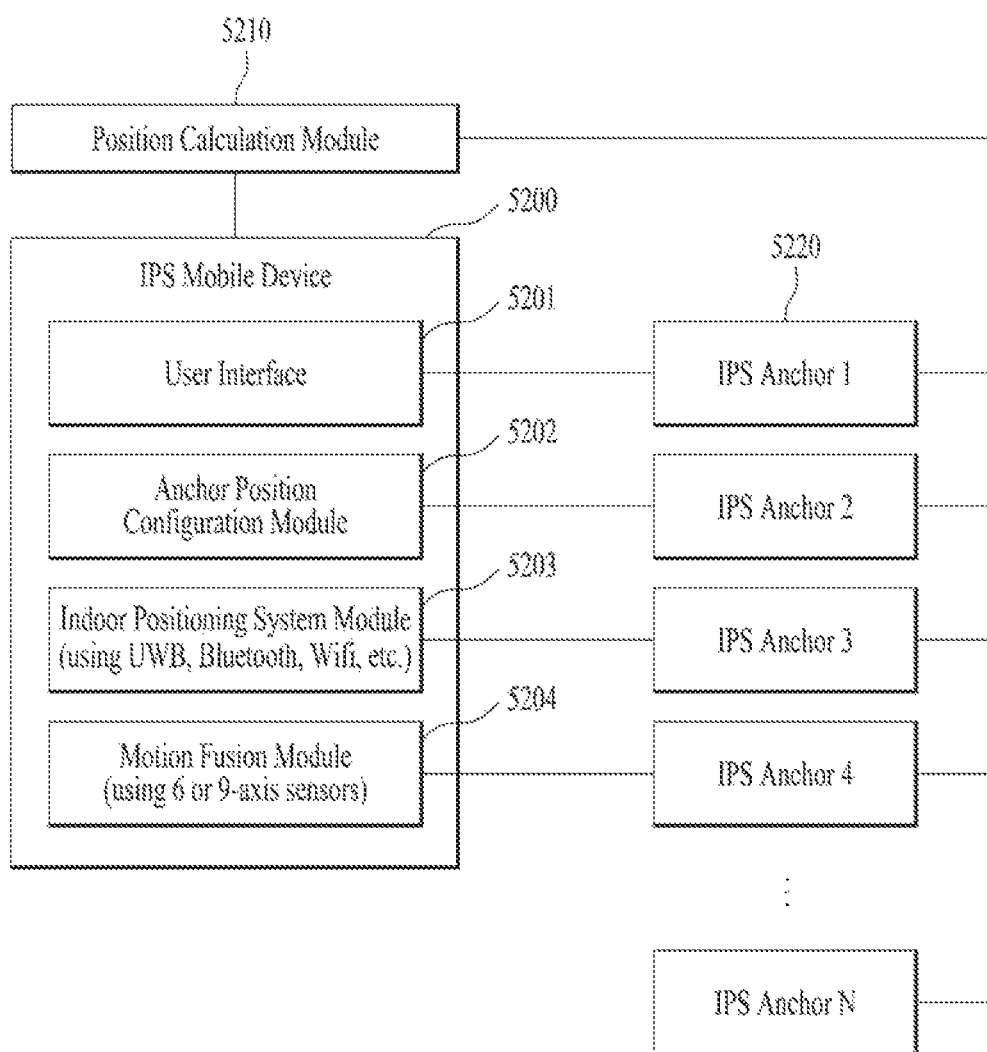
FIG. 12 is a view illustrating components of a mobile device according to another embodiment of the present disclosure.

FIG. 12 is a view illustrating components of a mobile device according to another embodiment of the present disclosure.

As illustrated in FIG. 12, a mobile terminal 5200 is designed to communicate with a position calculation module 5210 and IPS reference devices 5220. The position calculation module 5210 functions to calculate the positions of the mobile terminal 5200 and the reference devices 5220 in an IPS environment. The position calculation module 5210 may be configured as an independent entity such as a gateway or a server, or may be designed to be incorporated in the mobile terminal 5200.

According to another embodiment of the present disclosure, the mobile terminal 5200 includes a UI 5201, an anchor position configuration module 5202, an IPS module 5203, and a motion fusion module 5204. The IPS module 5203 is configured to use, for example, UWB, Bluetooth, or Wi-Fi. The motion fusion module 5204 is configured to be, for example, a 6-axis or 9-axis sensor. The 6-axis sensor includes an acceleration sensor which senses a motion in a space and a geomagnetic sensor which senses directionality, and the 9-axis sensor includes an inclination sensor in addition to the above features of the 6-axis sensor.

The geomagnetic sensor is designed to sense, for example, the directions of North, East, South, and West, the inclination sensor is designed to sense a turned state or an upside-down state of the mobile terminal, and the acceleration sensor is designed to sense shaking or movement of the mobile terminal.

Therefore, the mobile terminal 5200 including the modules illustrated in FIG. 12 is capable of calculating the positions of the reference devices 5220. The reference devices 5220 may communicate with each other, and measure the distances between them by time of arrival (TOA), time of flight (TOF), RSSI, or the like. Meanwhile, the content described with reference to FIG. 12 will be described below in detail with reference to the flowchart illustrated in FIG. 13.

Meanwhile, TOA and triangulation as described herein will be described below in greater detail.

In the TOA scheme, a distance is calculated by measuring the TOA of a signal between a mobile device and a stationary device. A TOA may be calculated synchronously or asynchronously. In the synchronous scheme, a receiver and a beacon are synchronized to each other in time, and the beacon transmits a signal indicating an absolute current time to the receiver. Due to the time synchronization between the receiver and the beacon, the receiver may calculate an absolute TOA of a signal with the beacon during a reception period by measuring the reception time of a signal. Accordingly, the distance may be calculated from a known transmission rate of a signal and the TOA. In the asynchronous scheme, there is no need for time synchronization between the receiver and the beacon. The beacon transmits a signal to the receiver shortly after recording a current time. The receiver returns the signal received from the beacon to the beacon. If a time delay involved in transmitting the received signal from the receiver to the beacon is constant, the beacon may calculate the distance between the beacon and the receiver based on the difference between the transmission time and reception time of the signal and the time delay of the receiver. As a scheme which enables measurement of round-trip time of flight (TOF) of a signal between two asynchronous receivers, there is a TWR scheme.

In the TWR distance measurement scheme, a distance is measured from the transmission time and propagation speed of a signal which starts from a transmitter and arrives at a receiver. The TWR distance measurement scheme has a higher accuracy than a conventional RSSI-based scheme, and is based on actual RF waves faster than ultrasonic waves by about 900,000 times. The above-described schemes are applicable between reference devices or between a reference device and a mobile terminal.

Triangulation-based positioning is a method of estimating the position of a mobile terminal by calculating the distances between three or more origins (reference devices or anchor devices) and the mobile terminal. The distance between an origin and the mobile terminal is calculated by using a propagation property value such as RSSI.

Figure 13:
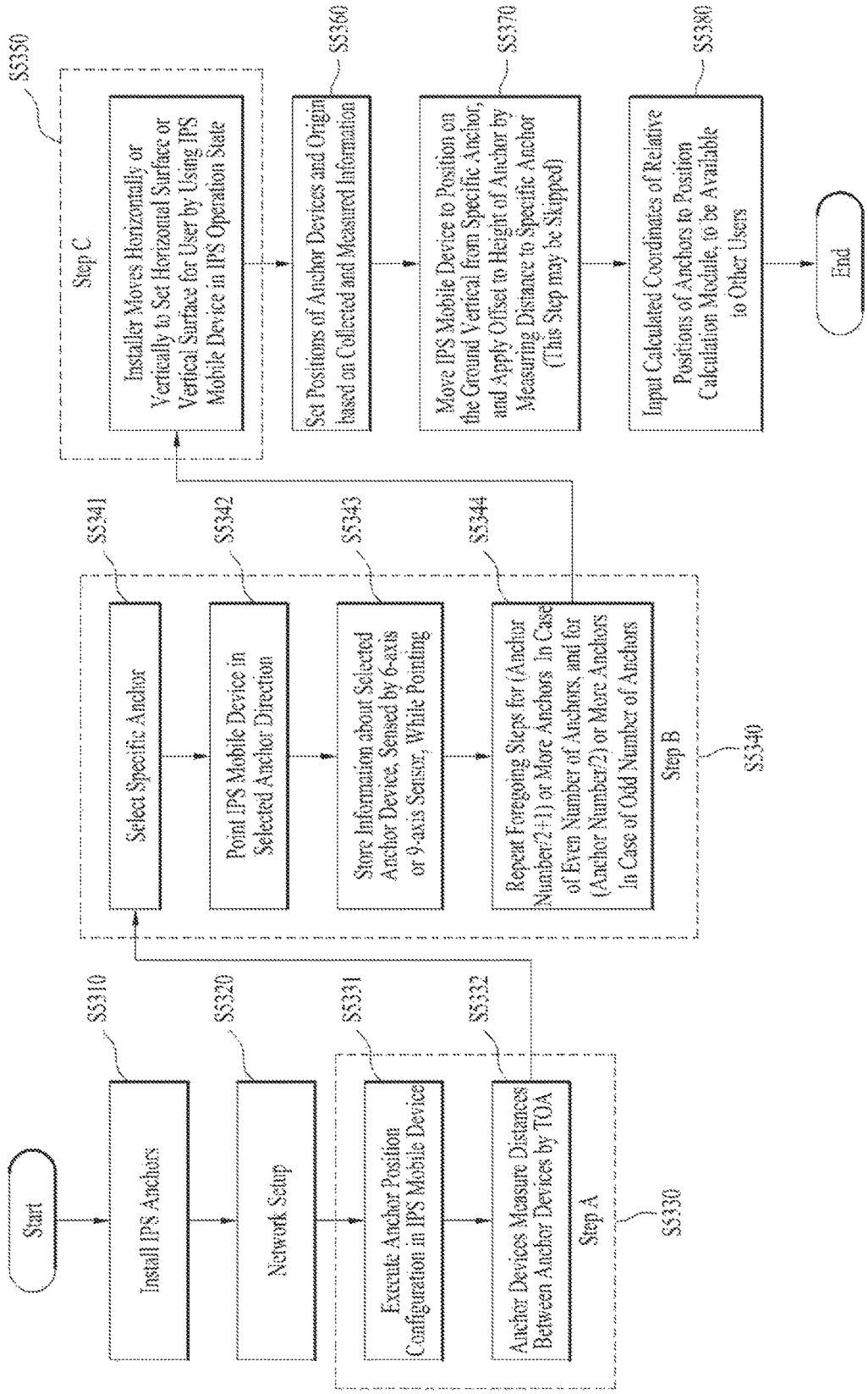
FIG. 13 is a flowchart illustrating a method for controlling a mobile terminal according to another embodiment of the present disclosure.

FIG. 13 is a flowchart illustrating a method for controlling a mobile terminal according to another embodiment of the present disclosure. FIG. 13 depicts a method for more accurately calculating the positions of reference devices, which are not determined in FIG. 11 described before. Particularly, step B in FIG. 13 is a main feature of the present disclosure, and enhancing the technical effects of the present disclosure by adding step C is another feature of the present disclosure.

First, an overall description will be given below of main steps (step A, step B and step C) illustrated in FIG. 13.

Step A of FIG. 13 is a step of detecting the distances between the reference devices illustrated in FIG. 11. Each reference device may measure the distances to other reference devices by a TOF or RSSI algorithm. After step A, a polyhedron is defined by the reference devices, as illustrated in (b) of FIG. 14.

Step B of FIG. 13 is a step of removing the image formed by the mirror plane, illustrated in FIG. 11, and determining rotation angles of each reference device with respect to a horizontal surface in the gravity direction and with respect to the magnetic north direction. Step B may be performed by using the 6-axis or 9-axis sensor of the mobile terminal.

If the result value of step B of FIG. 13 is within a predetermined error rage, step C may not be performed. However, step C is a step of accurately correcting a rotation angle with respect to the horizontal surface in the gravity direction. For example, if the distance between reference devices is too large or the reference devices are not within a line of sight (LOS) range for each other, step C is needed to enhance the accuracy of step B.

Meanwhile, the sequence of steps A, B and C is not limited to an alphabetical order, and a modification to a part of the sequence also falls within the scope of the present disclosure. Each step illustrated in FIG. 13 will be described below in greater detail.

As illustrated in FIG. 13, it is assumed that a plurality of reference devices are installed in a home (S5310). A network is set up so that each reference device may communicate with the mobile terminal (S5320).

Step A (S5330) of FIG. 13 includes steps S5331 and S5332, which will be described in detail with reference to FIG. 14. The mobile terminal (IPS mobile device) executes an anchor position configuration function (S5331). The anchor position configuration function corresponds to a command for calculating the coordinates of the reference devices. Further, the reference devices (or anchor devices) measure the distances between the reference devices by communicating with each other (S5332).

Step B (S5340) of FIG. 13 includes steps S5341, S5342, S5343, and S5344, which will be described in detail with reference to FIG. 15. A reference device is arbitrarily selected by means of the mobile terminal (S5341). The mobile terminal points in a direction in which the selected reference device is located (S5342).

Herein, the mobile terminal stores the distance between the mobile terminal and the reference device in the memory by a TOF or RSSI algorithm, and further stores information sensed by the 6-axis or 9-axis sensor in the memory (S5343). That is, it is possible to acquire information about the directionality of each reference device based on the information sensed by the 6-axis or 9-axis sensor of the mobile terminal, and the distance information.

Finally, another feature of step B is step S5344. It is possible to estimate the positions of all the reference devices without repeating steps S5341 to S5343 for all the reference devices.

If the number of the in-home reference devices is an even number, steps S5341 to S5343 may be repeated only for ((the total number of the reference devices/2)+1) or more reference devices, while there is no need for performing the steps for the remaining reference devices. On the other hand, if the number of the in-home reference devices is an odd number, steps S5341 to S5343 may be repeated only for (the total number of the reference devices/2) or more reference devices, while there is no need for performing the steps for the remaining reference devices. This is because it is assumed that distance information between the reference devices is already known.

Step C of FIG. 13 (S5350) will be described below in greater detail with reference to FIG. 16. Step C may be understood as another embodiment of the present disclosure.

The position of each reference is set on the basis of data collected in the afore-described steps S5310 through S5350 (S5360).

Further, the mobile terminal is placed at a position on the ground in a vertical direction from the arbitrary reference device. The distance between the reference device and the mobile terminal on the ground is calculated to thereby apply an offset to the height of the reference device (S5370). This operation will be described below in greater detail with reference to FIG. 17.

The position information about each reference device, determined in steps S5310 through S5370, is shared with another mobile terminal or device through the position calculation module 5210 illustrated in FIG. 12 (S5380).

Figure 14:
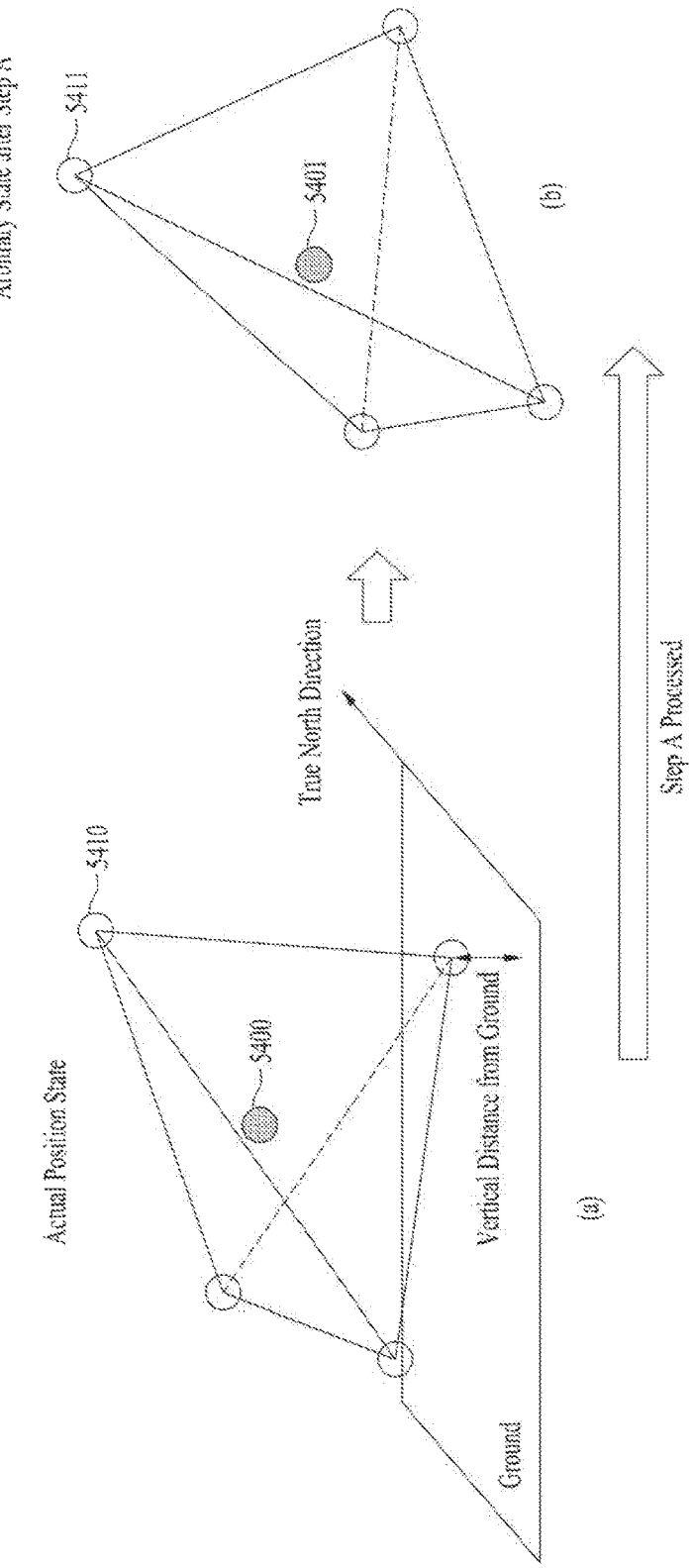
FIG. 14 is a view referred to for further describing step A illustrated in FIG. 13.

FIG. 14 is a view referred to for further describing step A of FIG. 13.

As illustrated in (a) of FIG. 14, since a reference device 5410 has no knowledge of the distances to other reference devices before step A of FIG. 13 is performed, the reference device 5410 cannot estimate a tetrahedron defined by a plurality of reference devices. Therefore, a mobile terminal 5400 does not know the position of the reference device at all.

On the other hand, if step A of FIG. 13 is performed, the reference device 5411 acquires information about relative distances to the other reference devices, as illustrated in (b) of FIG. 14. Therefore, as illustrated in (b) of FIG. 14, a tetrahedron defined by reference devices 5411 in a home in which the mobile terminal 5401 is located is determined. However, as described before with reference to FIG. 11, the mobile terminal 5401 does not accurately know the positions of the reference devices 5411 only with the distance information between the reference devices (i.e., there are no directionalities because of the absence of rotation information).

Figure 15:
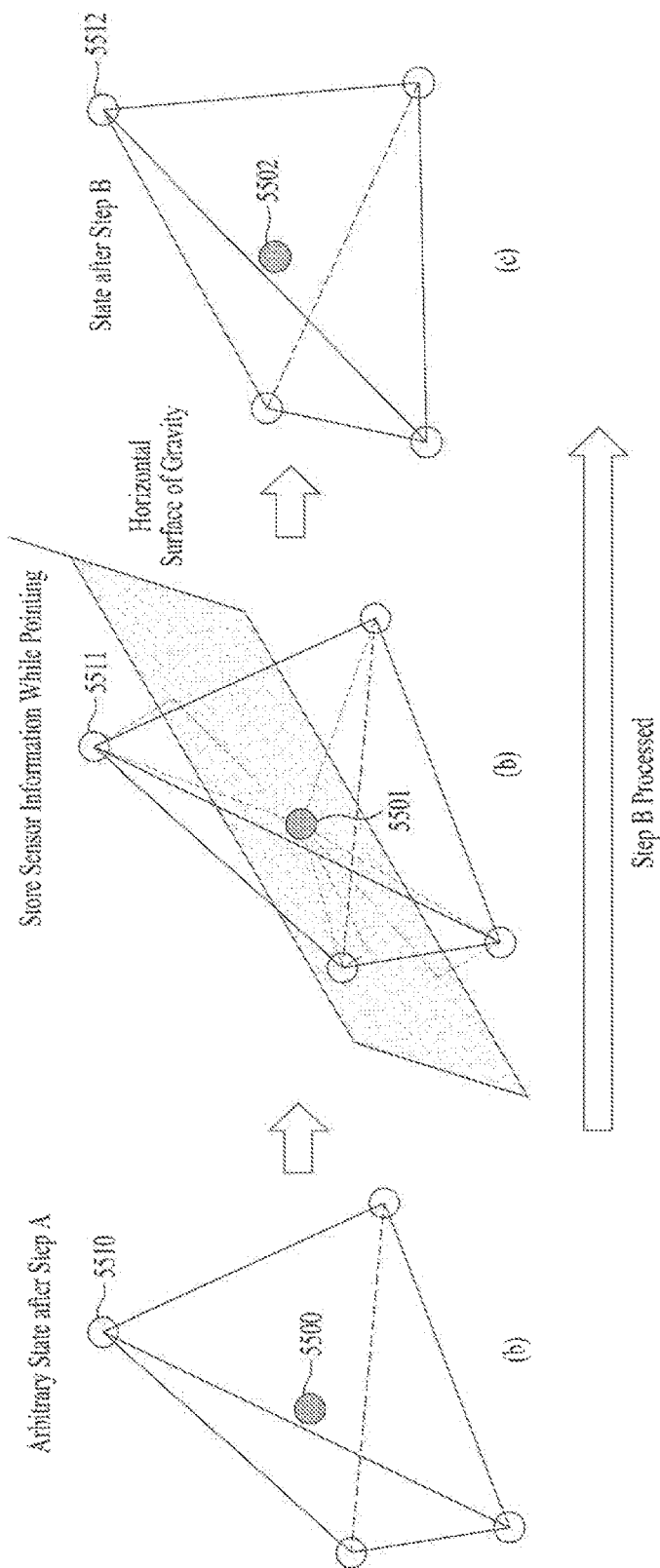
FIG. 15 is a view referred to for further describing step B illustrated in FIG. 13.

FIG. 15 is a view referred to for further describing step B of FIG. 13.

Step (a) of FIG. 15 corresponds to step (b) of FIG. 14. That is, although a reference device 5510 illustrated in (a) of FIG. 15 may determine the distances to the other reference devices, a mobile terminal 5500 does not have directionality information about each reference device.

Accordingly, as illustrated in (b) of FIG. 15, the mobile terminal 5501 may point at an arbitrary reference device 5511, and determine the rotation state of the reference device 5511 with respect to the gravity direction and the magnetic north direction by means of the 6-axis/9-axis sensor of the mobile terminal 5501.

Finally, as illustrated in (c) of FIG. 15, since a mobile terminal 5502 has the directionality information about a reference devices 5512 as well as the distance information about the reference device 5512, the mobile terminal 5502 can advantageously determine an actual object, not the image formed by the mirror plane, illustrated in FIG. 11.

Meanwhile, if the accuracy of the 6-axis or 9-axis sensor in the mobile terminal 5502 is high, an error is small. Therefore, the image determined in (c) of FIG. 15 is almost identical to the actual object. However, if the accuracy of information sensed by the 6-axis or 9-axis sensor is relatively low, the image illustrated in (c) of FIG. 15 may be slightly rotated, unlike the actual object. To solve this problem, a process (step C of FIG. 13) described below with reference to FIG. 16 is needed.

Figure 16:
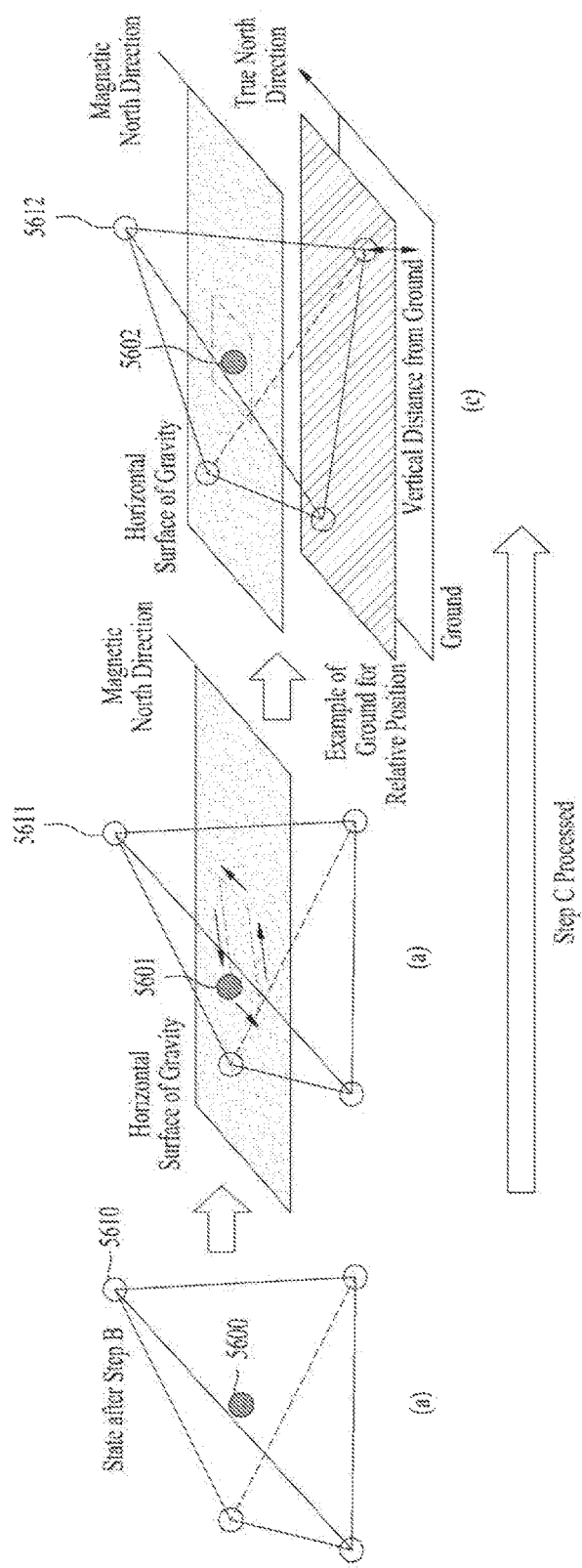
FIG. 16 is a view referred to for further describing step C illustrated in FIG. 13.

FIG. 16 is a view referred to for further description step C of FIG. 13. As described before, it is designed that if the error exceeds a predetermined range after step B, step C is performed.

(a) of FIG. 16 corresponds to (b) of FIG. 15, and it is assumed that reference devices 5610 are capable of communicating with the mobile terminal. Further, as illustrated in (b) of FIG. 16, it is designed that reference devices 5611 are maintained in a stationary state, whereas a mobile terminal 5601 is maintained to be at a fixed height and further in a horizontal state. For example, as illustrated in (b) of FIG. 16, if the mobile terminal 5601 forms any plane (indicated by a dotted line), the plane should be parallel to the ground or the horizontal surface. If the plane is not parallel to the ground or the horizontal surface, it may be considered that as much an inclination error as the angle difference exists. Therefore, the angle difference is compensated for, to thereby adjust the angle between a mobile terminal 5602 and a reference device 5612, as illustrated in (c) of FIG. 16.

That is, a comparison between (b) of FIG. 16 and (c) of FIG. 16 reveals that a closed curve formed by the mobile terminal has been adjusted to be perfectly parallel to the ground. Apparently, while the plane formed by the mobile terminal is shown in FIG. 16 as a square closed curve, the plane may be modified to another shape representing a horizontal surface, which also falls within the scope of the present disclosure.

Figure 17:
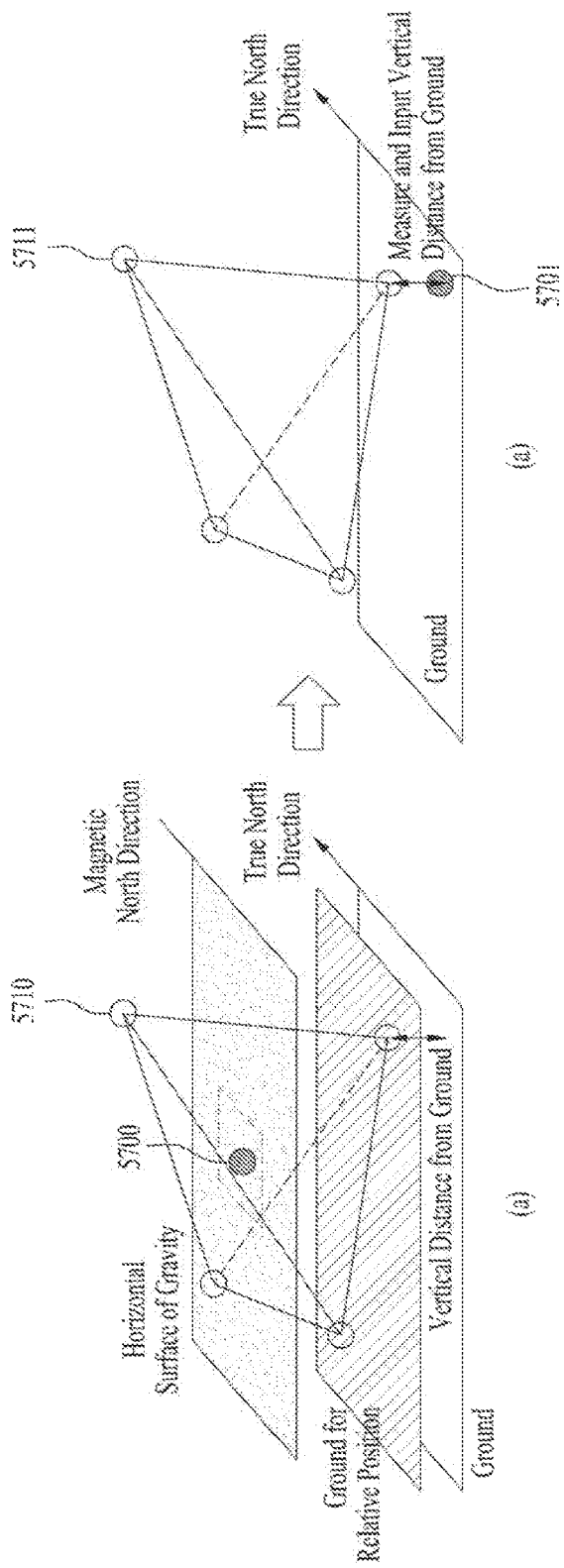
FIG. 17 is a view referred to for further describing step S5370 illustrated in FIG. 13.

FIG. 17 is a view referred to for further describing step S5370 illustrated in FIG. 13. (a) of FIG. 17 corresponds to (c) of FIG. 16. However, as illustrated in (a) of FIG. 17, a mobile terminal 5700 is likely to collect data including a slight error for height information about a reference device 5710. To solve this problem, (b) of FIG. 17 is provided.

That is, as illustrated in (b) of FIG. 17, a mobile terminal 5701 is placed on the ground. Particularly, the mobile terminal 5701 is placed at a point of the ground vertical from the reference device 5711. Therefore, the distance between the arbitrary specific reference device 5711 and the mobile terminal 5701 is measured, to thereby apply an offset to a height above the ground.

The forgoing drawings have been described on the assumption that there are at least three or four reference devices. Meanwhile, if there is only one reference device, the position of the reference device with respect to the magnetic north direction based on a mobile terminal with a 9-axis sensor may be recorded by pointing at the reference device with the mobile terminal, and used in conjunction with another positioning system such as a geomagnetic fingerprinting scheme. Also, if there are two reference devices, an indoor positioning algorithm such as an angle of arrival (AOA) scheme may be applied.

Meanwhile, in the fingerprinting scheme, when a user carrying a terminal capable of communicating with an AP enters in an environment in which APs are installed, the strength of a signal from an AP is determined and compared with the strengths of signals from reference points (RPs) (or reference devices) pre-stored in a database, and an RP having a most similar characteristic is estimated to be the position of the user.

This scheme is divided into a training step of detecting signal characteristics in predetermined areas and storing the detected signal characteristics in a DB, and a positioning step of determining the position of an object based on the training step. Despite the shortcoming that an operation of presetting areas before positioning, detecting signal characteristics in each area, and storing the signal characteristics in a DB should be performed preliminarily, and this operation should be performed again each time the environment of positioning areas is changed, this scheme is advantageously less limited by an ambient environment and more accurate in positioning than a conventional modeling-based positioning scheme.

Fingerprinting schemes are divided into a deterministic fingerprinting scheme and a probabilistic fingerprinting scheme depending on which finger data is to be stored in a DB for fingerprinting-based positioning or how this data is to be used for positioning.

Figure 18:
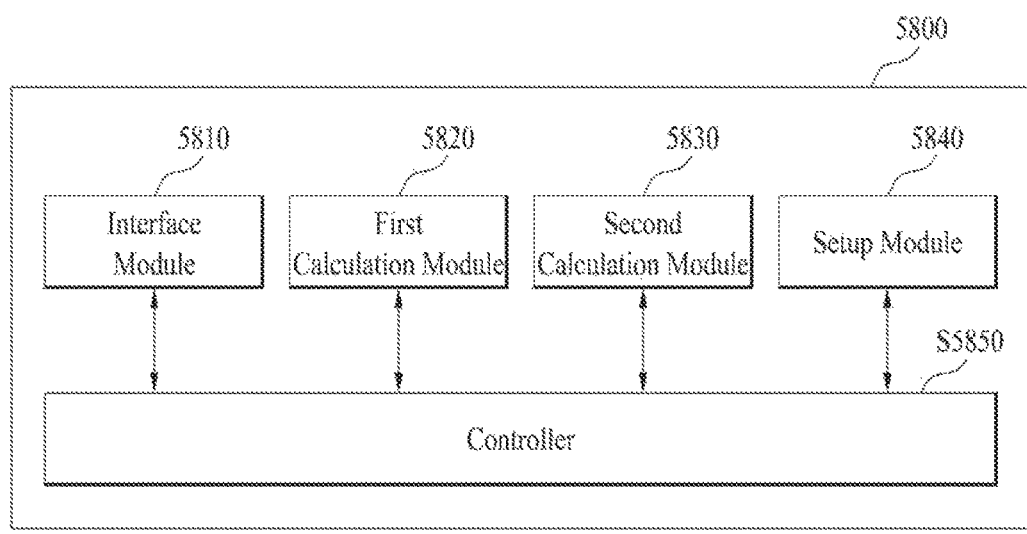
FIG. 18 is a view illustrating components of a mobile device according to another embodiment of the present disclosure.

FIG. 18 is a view illustrating components of a mobile terminal according to another embodiment of the present disclosure. As illustrated in FIG. 18, a mobile terminal 5800 includes an interface module 5810, a first calculation module 5820, a second calculation module 5830, a setup module 5840, and a controller 5850.

The interface module 5810 points at a direction toward any of a plurality of in-home reference devices. The interface module 5810 may be configured specially as a component without a communication means in the mobile terminal 5800, and it is sufficient for the interface module 5810 to function to point.

The first calculation module 5820 calculates the distance between the mobile terminal 5800 and the arbitrary reference device, and the second calculation module 5830 calculates information about a direction toward the arbitrary reference device by means of a sensing module. Apparently, the first and second calculation modules may be designed to be one module, and the sensing module corresponds to, for example, a 6-axis or 9-axis sensor.

The controller 5850 controls the steps to be repeated restrictively according to the number of the plurality of in-home reference devices, and the setup module 5840 sets the position of each of the plurality of in-home reference devices on the basis of the calculation results.

If the number of the in-home reference devices is an even number, the controller 5850 controls repetition of the pointing operation and the calculation operations for ((the total number of the reference devices/2)+1). Further, if the number of the in-home reference devices is an odd number, the controller 5850 controls repetition of the pointing operation and the calculation operations for (the total number of the reference devices/2) or more reference devices.

While not shown in FIG. 18, according to another embodiment of the present disclosure, the mobile terminal further includes a reception module which receives information about the distances between the plurality of in-home reference devices.

While not shown in FIG. 18, according to another embodiment of the present disclosure, the mobile terminal further includes a third calculation module which calculates an error between the mobile terminal and a horizontal surface or a vertical surface. The setup module 5840 resets the position of each of the plurality of in-home reference devices according to the calculated error.

While not shown in FIG. 18, according to another embodiment of the present disclosure, the mobile terminal further includes a third calculation module which calculates the distance between the mobile terminal placed on the ground and the arbitrary reference device. The setup module 5840 resets the position of each of the plurality of in-home reference devices according to the calculated distance.

The second calculation module 5830 calculates a first angle between the arbitrary reference device and the gravity direction and a second angle between the arbitrary reference device and the magnetic north direction by using the 6-axis or 9-axis sensor.

The mobile terminal 5800 corresponds to one of, for example, a portable phone, a tablet PC, or a wearable device.

Figure 19:
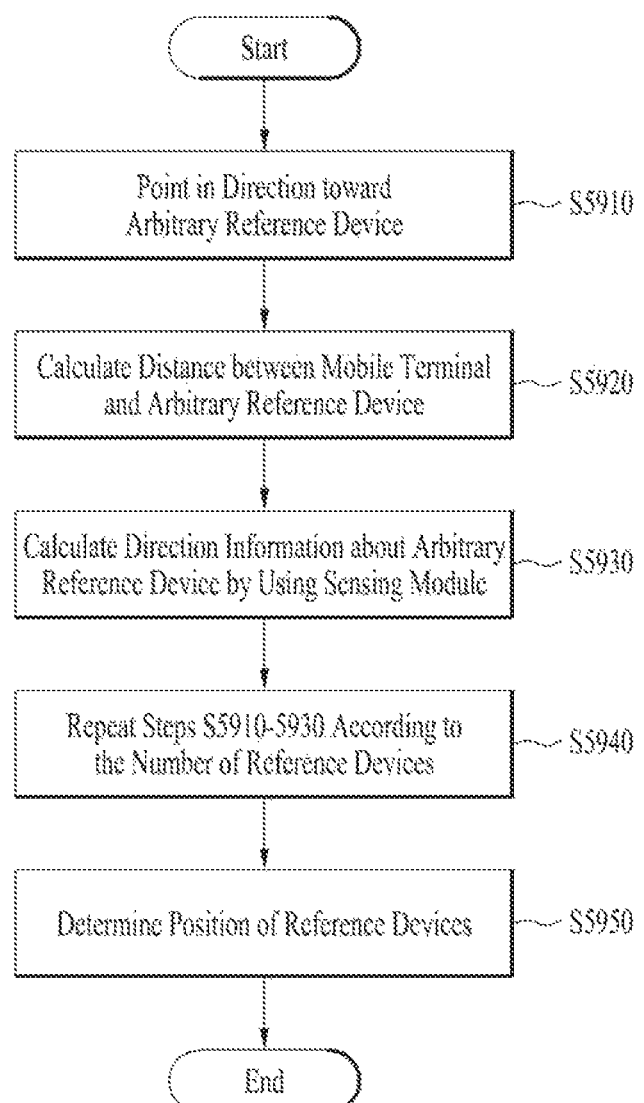
FIG. 19 is a flowchart illustrating a method for controlling a mobile terminal according to another embodiment of the present disclosure.

FIG. 19 is a flowchart illustrating a method for controlling a mobile terminal according to another embodiment of the present disclosure.

According to another embodiment of the present disclosure, the mobile terminal points at an arbitrary reference device among a plurality of in-home reference devices (S5910) and calculates the distance between the mobile terminal and the arbitrary reference device (S5920).

The mobile terminal calculates information about a direction toward the arbitrary reference device by using a sensing module (S5930), and controls the above steps to be restrictively repeated according to the number of the plurality of in-home reference devices (S5940). Then, the mobile terminal sets the position of each of the plurality of in-home reference devices based on the calculation results.

The above-described present disclosure may be implemented as code that can be written as a computer-readable code on a medium recording a program. The computer-readable recording medium may be any type of recording device in which data is stored in a computer-readable manner. Examples of the computer-readable recording medium include a hard disk drive (HDD), a solid state disk (SSD), a silicon disk drive (SDD), a read only memory (ROM), a random access memory (RAM), a compact disk ROM (CD-ROM), a magnetic tape, a floppy disc, an optical data storage, and a carrier wave (e.g., data transmission over the Internet). The computer may include the controller 180 of the terminal. The above embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

Mode for Carrying out the Invention

Various embodiments have been described in the best mode for carrying out the invention, and some of the embodiments can be modified by a person skilled in the art.

INDUSTRIAL APPLICABILITY

The present disclosure is applicable to IoT devices such as mobile devices and TVs, and thus its industrial applicability is acknowledged.

The invention claimed is:

1. A method for controlling a digital device capable of communicating with a mobile device, the method comprising:
   receiving a first pointing signal from the mobile device;
   if the received first pointing signal is sensed in a first virtual region, accessing a memory;
   receiving a second pointing signal from the mobile device; and
   if the received second pointing signal is sensed in a second virtual region, executing a specific function of the digital device, referring to the memory.

2. The method according to claim 1, wherein the first virtual region includes a range in which a point pointed at by the mobile device is formed within the digital device, and the second virtual region includes a range in which a point pointed at by the mobile device is formed outside the digital device.

3. The method according to claim 1, wherein the memory stores the specific function mapped to the second virtual region.

4. The method according to claim 1, wherein a plurality of second virtual regions are defined, and separated with respect to the digital device.

5. The method according to claim 1, wherein the second virtual region is changed according to a distance between the mobile device and the digital device or an angle between the mobile device and the digital device.

6. A method for controlling a mobile device capable of communicating with a digital device, the method comprising:
   transmitting a first pointing signal to a first virtual region;
   displaying an identification (ID) identifying the digital device located in the first virtual region;
   transmitting a second pointing signal to a second virtual region; and
   transmitting, to the digital device, a command for execution of a specific function of the digital device, referring to a memory.

7. The method according to claim 6, wherein the first virtual region includes a range in which a point pointed at by the mobile device is formed within the digital device, and the second virtual region includes a range in which a point pointed at by the mobile device is formed outside the digital device.

8. The method according to claim 6, wherein the memory stores the specific function mapped to the second virtual region.

9. The method according to claim 6, wherein a plurality of second virtual regions are defined, and separated with respect to the digital device.

10. The method according to claim 6, wherein the second virtual region is changed according to a distance between the mobile device and the digital device or an angle between the mobile device and the digital device.

11. A digital device capable of communicating with a mobile device, the digital device comprising:
    a communication module configured to conduct data communication with the mobile device;
    a memory configured to store at least one data; and
    a controller coupled to the communication module and the memory,
    wherein the controller is configured to receive a first pointing signal from the mobile device by controlling the communication module, to access the memory, if the received first pointing signal is sensed in a first virtual region, to receive a second pointing signal from the mobile device by controlling the communication module, and to execute a specific function of the digital device, referring to the memory, if the received second pointing signal is sensed in a second virtual region.

12. The digital device according to claim 11, wherein the first virtual region includes a range in which a point pointed at by the mobile device is formed within the digital device, and the second virtual region includes a range in which a point pointed at by the mobile device is formed outside the digital device.

13. The digital device according to claim 11, wherein the memory stores the specific function mapped to the second virtual region.

14. The digital device according to claim 11, wherein a plurality of second virtual regions are defined, and separated with respect to the digital device.

15. The digital device according to claim 11, wherein the second virtual region is changed according to a distance between the mobile device and the digital device or an angle between the mobile device and the digital device.

16. A mobile device capable of communicating with a digital device, the mobile device comprising:
    a display module;
    a communication module configured to conduct data communication with the digital device;
    a memory configured to store at least one data; and
    a controller coupled to the display module, the communication module, and the memory,
    wherein the controller is configured to transmit a first pointing signal to a first virtual region by controlling the communication module, to display an identification (ID) identifying the digital device located in the first virtual region by controlling the display module, to transmit a second pointing signal to a second virtual region by controlling the communication module, and to transmit, to the digital device, a command for execution of a specific function of the digital device, referring to the memory.

17. The mobile device according to claim 16, wherein the first virtual region includes a range in which a point pointed at by the mobile device is formed within the digital device, and the second virtual region includes a range in which a point pointed at by the mobile device is formed outside the digital device.

18. The mobile device according to claim 16, wherein the memory stores the specific function mapped to the second virtual region.

19. The mobile device according to claim 16, wherein a plurality of second virtual regions are defined, and separated with respect to the digital device.

20. The mobile device according to claim 16, wherein the second virtual region is changed according to a distance between the mobile device and the digital device or an angle between the mobile device and the digital device.

* * * * *